United States Patent
Wakabayashi et al.

(10) Patent No.: US 9,908,060 B2
(45) Date of Patent: *Mar. 6, 2018

(54) HEAT INTEGRATED DISTILLATION APPARATUS

(71) Applicant: TOYO ENGINEERING CORPORATION, Tokyo (JP)

(72) Inventors: Toshihiro Wakabayashi, Narashino (JP); Takato Nakao, Narashino (JP)

(73) Assignee: Toyo Engineering Corporation, Tokyo (JP)

( * ) Notice: Subject to any disclaimer, the term of this patent is extended or adjusted under 35 U.S.C. 154(b) by 749 days.

This patent is subject to a terminal disclaimer.

(21) Appl. No.: 13/788,423

(22) Filed: Mar. 7, 2013

(65) Prior Publication Data

US 2013/0256115 A1    Oct. 3, 2013

(30) Foreign Application Priority Data

Mar. 30, 2012    (JP) .................. 2012-080525

(51) Int. Cl.
*B01D 3/14* (2006.01)
*B01D 3/00* (2006.01)
(Continued)

(52) U.S. Cl.
CPC ............. *B01D 3/007* (2013.01); *B01D 1/28* (2013.01); *B01D 3/143* (2013.01); *B01D 3/322* (2013.01); *B01D 3/4261* (2013.01)

(58) Field of Classification Search
CPC ........ B01D 3/007; B01D 3/143; B01D 3/322; B01D 3/4261; B01D 1/28
See application file for complete search history.

(56) References Cited

U.S. PATENT DOCUMENTS 3,575,007 A * 4/1971 Gunther .......................... 62/620
4,234,391 A * 11/1980 Seader ............................ 203/26
(Continued)

FOREIGN PATENT DOCUMENTS

JP    2004-016928 A    1/2004
JP    4803470 B2    8/2011

OTHER PUBLICATIONS

Energy Saving Distillation—Heat pump and HIDiC, Workshop of disitllation with difficult separation and an incidental facilities design , Society of Separation Process Engineers , Japan, Sep. 17, 2010.*

*Primary Examiner* — Jonathan Miller
(74) *Attorney, Agent, or Firm* — Knobbe, Martens, Olson & Bear, LLP

(57) ABSTRACT

A distillation apparatus of the present invention includes high-pressure column 1 corresponding to a region above a heat exchanging section located at a lowermost part of a region including a trayed section or a packed bed section, which is used as a rectifying section; and low-pressure column 2 that is located above as seen from high-pressure column 1, which integrates a region including a trayed section or a packed bed section which is used as a stripping section, with rectifying section corresponding portion 2g that corresponds to a region locating below the heat exchanging section located at the lowermost part in the rectifying section. Rectifying section corresponding portion 2g is located on top 2c of the stripping section in low-pressure column 2 so that rectifying section corresponding portion 2g continues to the stripping section.

5 Claims, 10 Drawing Sheets

(51) Int. Cl.
    *B01D 1/28*        (2006.01)
    *B01D 3/32*        (2006.01)
    *B01D 3/42*        (2006.01)

(56) References Cited

U.S. PATENT DOCUMENTS

| | | | | |
|---|---|---|---|---|
| 4,277,268 | A | * | 7/1981 | Spangler, Jr. .................... 62/630 |
| 4,539,076 | A | * | 9/1985 | Swain ............................ 202/154 |
| 4,737,177 | A | * | 4/1988 | Erickson ......................... 62/646 |
| 4,961,826 | A | * | 10/1990 | Grethlein et al. .............. 203/19 |
| 5,351,492 | A | * | 10/1994 | Agrawal et al. ................ 62/648 |
| 5,435,436 | A | * | 7/1995 | Manley et al. ................. 203/74 |
| 5,737,940 | A | * | 4/1998 | Yao et al. ....................... 62/620 |
| 5,783,047 | A | * | 7/1998 | Aso et al. ...................... 202/154 |
| 6,045,660 | A | * | 4/2000 | Savage et al. ................. 202/172 |
| 6,348,137 | B1 | * | 2/2002 | Nommensen ................... 203/49 |
| 6,605,190 | B1 | * | 8/2003 | Salamon et al. ................. 203/1 |
| 7,824,542 | B2 | * | 11/2010 | Menzel .......................... 208/341 |
| 7,972,423 | B2 | * | 7/2011 | Jensen ............................ 96/234 |
| 8,002,952 | B2 | * | 8/2011 | Sechrist ......................... 202/153 |
| 2008/0135396 | A1 | * | 6/2008 | Blum ............................. 203/25 |

\* cited by examiner

PRIOR ART

PRIOR ART

PRIOR ART

HEAT INTEGRATED DISTILLATION APPARATUS

This application is based upon and claims the benefit of priority from Japanese patent application No. 2012-080525, filed on Mar. 30, 2012, the disclosure of which is incorporated herein in its entirety by reference.

BACKGROUND OF THE INVENTION

1. Field of the Invention

The present invention relates to a distillation apparatus that carries out a distillation operation widely applied to many industrial processes, and more particularly to a heat integrated distillation apparatus.

2. Description of the Related Art

Distillation separation is a unit operation widely applied to industrial processes in general, but consumes a large amount of energy. In the industrial field, therefore, studies have been conducted on an energy saving distillation systems. Such studies have brought about development of a heat integrated distillation column (hereinafter, HIDiC) as a distillation apparatus that save much energy.

As shown in FIG. 1, a basic system of the HIDiC has a structure where a rectifying section (high-pressure unit) and a stripping section (low-pressure unit) are provided such that they are separate from each other. Operation pressure of the rectifying section is set higher than that of the stripping section so that the operation temperature of the rectifying section can be higher than that of the stripping section. This enables a reduction in the amount of heat that is supplied to a reboiler because heat transfer occurs from the rectifying section to the stripping section when there is a heat-exchange surface therebetween. Heat of the rectifying section moves to the stripping section, and hence the amount of heat that is supplied at a reboiler can be reduced. As a result, high energy saving distillation apparatus can be achieved.

In order to put the concept of HIDiC to practical use, a number of distillation apparatuses having double-pipe structures, that is, double-pipe structures constituted of inner pipes forming rectifying sections and outer pipes forming stripping sections (refer to JP2004-16928A) have been proposed. These configurations are described as being capable of reducing the amounts of heat that are supplied to the reboilers and the amounts of heat that are removed at the condensers, since heat transfer occurs from the rectifying sections (inner pipes) to the stripping sections (outer pipes).

However, the heat integrated distillation apparatus having the rectifying section and the stripping section formed into the double-pipe structures as discussed in Patent Literature 1 had the following problems 1) to 6).

1) The product cannot be obtained with side-cut stream. The side-cutting means that a product is withdrawn as an intermediate distillate product, during a distillation process until an end distillate is acquired from top of column.

In the distillation apparatus described in JP2004-16928A, the tube units of the double-pipe structures are arranged to come into contact with each other. Moreover, the outer pipes and the inner pipes are equipped with the structured packing. As a result, no pipe arrangement can be formed to withdraw any intermediate distillate product from the inner pipe of each tube unit. Consequently, the structure disables side-cutting.

2) The feed stage where feed stream is provided cannot be optimized. This is because in the rectifying section and the stripping section formed into the double-pipe structures, packing heights thereof are equal, disabling free setting of the number of stages of the rectifying section and the stripping section.

3) The feed stage cannot be changed so as to meet the feed stream composition. This is because of the structure where free setting of the feeding stage position is disabled as described in 2).

4) Multi-feed stream (reception of a plurality of feed streams) cannot be dealt with. This is because of the structure where no feed stream can be supplied in the midway of the double-pipes as described in 1).

5) Maintenance of the apparatus is difficult. The tube units that use the structured packing are densely arranged to be adjacent to each other as described in 1). This disables complete access to the desired tube unit, and maintenance thereof cannot be carried out.

6) The heat exchanged rate between the rectifying section and the stripping section that uses double-pipes and in which there is no a degree of freedom in design for designing the heat transfer area, depends only on the temperature profile of the distillation column. Hence, in apparatus design, a degree of freedom in design of heat exchanged rate is small.

Q, the heat exchanged rate between the rectifying section and the stripping section, is represented by $Q=U \times A \times \Delta T$, where U is an overall heat-transfer coefficient, A is a heat transfer area, and $\Delta T$ is a temperature difference between the rectifying section and the stripping section. In the HIDiC using the double-pipe structure, an inner pipe wall surface becomes a heat transfer area. This heat transfer area has a fixed value determined by a structure of the double-pipes. The overall heat-transfer coefficient also has a fixed value determined by the heat transfer structure and fluid physical properties involved in heat exchange. Thus, as can be understood from the heat exchanged rate formula, a heat exchanged rate on design specification can be changed based only on the temperature difference between the rectifying section and the stripping section, which is changed by the operating pressure of the rectifying section and the stripping section.

As the heat integrated distillation apparatus that can solve the problem as described above, the present applicant has proposed the apparatus of JP4803470B.

FIG. 2 shows a first example of the distillation apparatus disclosed in JP4803470B. The distillation apparatus includes rectifying column 1, stripping column 2 located higher than rectifying column 1, first pipe 23 for communicating column top 2c of the stripping column with column bottom 1a of the rectifying column, and compressor 4 configured to compress vapor from column top 2c of the stripping column to feed the compressed vapor to column bottom 1a of the rectifying column. The distillation apparatus further includes tube-bundle-type heat exchanger 8 located at a predetermined stage of rectifying column 1, liquid withdrawal unit 2d located at a predetermined stage of stripping column 2 and configured to withdraw a part of liquid from the predetermined stage to the outside of the column, second pipe 24 for introducing the liquid from liquid withdrawal unit 2d to heat exchanger 8, and third pipe 25 for introducing fluids introduced through second pipe 24 to heat exchanger 8 and then discharged out of heat exchanger 8 to a stage directly below liquid withdrawal unit 2d.

With the above described configuration in FIG. 2, the fluids flow from stripping column 2 to heat exchanger 8 of rectifying column 1 through second pipe 24. Heat is removed from the vapor of rectifying column 1 in heat exchanger 8. Then, the heat can be transferred from rectifying column 1 to stripping column 2 through third pipe 25. The fluids flow from stripping column 2 to rectifying column 1 by gravity. The fluids in heat exchanger 8 are accordingly pushed to flow from rectifying column 1 to stripping column 2. In other words, this heat integrated distillation apparatus employs a thermo-siphon system, and hence no pressure-feeding means such as a pump is necessary for supplying the liquid from rectifying column 1 to stripping column 2 located above in a vertical direction.

FIG. 3 shows a second example of the distillation apparatus disclosed in JP4803470B. The distillation apparatus includes rectifying column 1, stripping column 2 located higher than rectifying column 1, first pipe 23 for connecting column top 2c of the stripping column with column bottom 1a of the rectifying column, and compressor 4 that compresses vapor from column top 2c of the stripping column to feed the compressed vapor to column bottom 1a of the rectifying column. The distillation apparatus further includes liquid sump unit 2e located at a predetermined stage of stripping column 2 and configured to hold liquid that has flowed downward, heat exchanger 8 located in liquid sump unit 2e, partition plate 16 that is set in a predetermined position of rectifying column 1 and configured to apart upper stages and lower stages completely, second pipe 29 for introducing vapor below partition plate 16 to heat exchanger 8, and third pipe 30 for introducing fluids introduced through second pipe 29 to heat exchanger 8 and then discharged out of heat exchanger 8 to an upper side of partition plate 16.

With the above described configuration in FIG. 3, the vapor is withdrawn from rectifying column 1 through second pipe 29. The vapor is introduced to heat exchanger 8 in stripping column 2. Then, heat can be transferred from rectifying column 1 to stripping column 2. High-pressure vapor in rectifying column 1 ascends through second pipe 29 to heat exchanger 8 in stripping column 2. A fluid partially or totally condensed from the vapor in heat exchanger 8 is accordingly pushed out from stripping column 2 to third pipe 30 outside the column. Thus, this configuration also necessitates no pressure-feeding means such as a pump in supplying liquid from stripping column 2 to rectifying column 1 located at a lower side in a vertical direction.

The apparatus configurations of FIGS. 2 and 3 described above are each capable of reducing the amount of heat that is removed at condenser 7 which is attached to a column top of rectifying column 1, and reducing the amount of heat of reboiler 3 attached to a column bottom of stripping column 2 more, as compared with an ordinary distillation apparatus which has a column in which an upper side is a rectifying section and a lower side is a stripping section with a feed location as a boundary thereof, and which is not of a heat integrated type. As a result, it is possible to provide an energy-efficient distillation apparatus.

Rectifying column 1 and stripping column 2 can be configured by using trayed sections or packed bed sections similar to those of a general distillation apparatus. Hence, the apparatus can deal with side cutting or multi-feed stream without the need for any improvement, and it is possible to easily perform maintenance of the apparatus. For the same reason, the number of stages of the rectifying column or the stripping column can be freely set, and a feed stage can be optimized.

A heat transfer area can be freely set, and hence the heat exchanged rate can be determined without any dependence on the temperature difference between the columns.

As described above, according to the apparatus example described in JP4803470B (FIGS. 2 and 3), energy efficiency is high, side-cutting and setting of a feed stage position can be easily dealt with, and maintenance of the apparatus is easy. Further, the apparatus of the present invention has a structure in which a degree of freedom in design is high, and hence can be easily accepted by the user side.

Incidentally, concerning the distillation apparatuses shown in FIGS. 2 and 3, the present inventors aim at further enhancement in energy efficiency, and the respective distillation apparatus examples still have the following room to be improved.

In other words, in the distillation apparatus shown in FIG. 2, the following method is adopted. Part or all of a liquid in an arbitrary stage of stripping column 2 is removed through pipe 24 outside the column, and is supplied to tube-bundle-type heat exchanger 8 located at an arbitrary stage of rectifying column 1, where heat exchange is performed. Thereafter, a part or all of the amount of the liquid which is removed from stripping column 2 is vaporized by vapor in rectifying column 1 at a higher temperature, and returns to directly below the above described liquid removal position of stripping column 2 via pipe 25 outside the column by a thermo-siphon effect, without energy given from outside by a pump or the like. Such circulation of the fluids is performed.

In such a method, a liquid head is needed at the supply side of tube-bundle-type heat exchanger 8 (pipe 24 outside the column) in order to perform circulation of the fluids by the thermo-siphon effect. In other words, as the portions extending in the vertical direction, of pipes 24 and 25 become long correspondingly to the distance (height) between liquid withdrawal position X from stripping column 2 and heat exchanger installation position Y of rectifying column 1, pressure loss through pipe 25 increases. Hence, in order to circulate the fluids by surpassing this, the liquid head based on the inlet position of heat exchanger 8 (end portion of pipe 24 connected with heat exchanger 8) also becomes large. In the tube of heat exchanger 8, however, the pressure becomes high and the boiling point increases due to the increase in the liquid head. Therefore, the temperature difference between the inside of the tube and the outside (shell) of the tube in heat exchanger 8 becomes small correspondingly to the increase of the boiling point. In order to compensate this, a necessity arises to increase the pressure of rectifying column 1, that is, to increase the temperature in rectifying column 1 by increasing the compression ratio of compressor 4. Thus, there is a room to be improved from the viewpoint of energy saving performance.

In other words, in the distillation apparatus shown in FIG. 3, the following method is adopted. Partition plate 16 that completely partitions the inside of the column to an upper side and a lower side is installed in an arbitrary stage of rectifying column 1, all of vapor ascending from below partition plate 16 is withdrawn from the column through pipe 29, and is supplied to tube-bundle-type heat exchanger 8 installed at an arbitrary stage of stripping column 2, where heat exchange is performed. Thereafter, a fluid partially or totally condensed in heat exchanger 8 flows through pipe 30 outside the column to the upper side of partition plate 16 in rectifying column 1 by gravity, and the condensed liquid flows through another pipe 31 to be movable to below partition plate 16. Such circulation of the fluids is performed.

Such a method intend to withdraw all of the vapor in rectifying column 1 to the outside of the column, and hence adopts a complicated structure in which partition plate 16 is installed in rectifying column 1, and the condensed liquid fed onto partition plate 16 from stripping column 2 is further transferred to a lower side space of partition plate 16 through pipe 31 and control valve 17 outside the column. Thus, there is a room to be improved from the viewpoint of the structure and manufacturing cost.

Further, drive force for the fluids passing through the tube of heat exchanger 8 is obtained by giving pressure loss at the upper and lower sides of partition plate 16, and hence pressure of column bottom 1*a* needs to be made larger than pressure of column top 1*c* of rectifying section 1 correspondingly to the pressure loss at the upper and lower sides of partition plate 16. Thus, there arises a need for setting pressure to be higher at an outlet side of compressor 4 (namely, increase a compression ratio) correspondingly to increase in the pressure at column bottom 1*a* side. Therefore, there is also a room to be improved from the viewpoint of energy saving performance.

In order to further improve both of the apparatus configuration examples of FIGS. 2 and 3 as above, the present inventors pay attention to the circumstances as follows.

When the stages for performing side heat exchange between the stripping section and the rectifying section are optimally selected, in order to put the concept of HIDiC to practical use, the lowermost stage of the rectifying section is not used for heat exchange with the stripping section in some cases. FIG. 4 shows a conceptual configuration of HIDiC in this case, and FIGS. 5 and 6 show examples of the mode of carrying out HIDiC in this case. In particular, FIG. 5 shows application of the heat transfer system of the apparatus of FIG. 2 to the conceptual configuration of FIG. 4, and FIG. 6 shows application of the heat transfer system of the apparatus of FIG. 3 to the conceptual configuration of FIG. 4.

As is understandable with reference to the configurations of FIGS. 4 to 6, a single stage or a plurality of stages in rectifying section lower part 1*d* is not or are not involved in heat exchange at all in many cases. This not only applies to the tray, but also to the packed bed layer. In the configurations as above, rectifying section lower part 1*d* which has the highest temperature is not effectively used for heat exchange.

In the configurations in which rectifying section lower part 1*d* is not used for heat exchange with the stripping section as in FIGS. 4 to 6, there is no need to connect the outlet pipe of compressor 4 to column bottom 1*a* (the lowermost portion of the rectifying section) of the rectifying column. Rather, connecting outlet pipe 4*a* of compressor 4 to the heat exchanging section (heat exchanging section directly above rectifying section lower part 1*d*) which is located at the lowest position of the rectifying section does not waste heat. However, if outlet pipe 4*a* of compressor 4 is directly connected to the heat exchanging section located at the lowermost position of the rectifying section without being directly connected to the lowermost portion of the rectifying section, there will not be any gas in lower part 1*d*, which is located below this, of the rectifying section, and therefore, distillation operation which has liquid-vapor equilibrium as the principle of separation is not established. Therefore, the apparatus which uses this method of connection cannot be realized.

Thus, the present inventors have decided to move and dispose region 2*g* (the region shown by the dotted line in FIG. 4), that corresponds to lower part 1*d* of the rectifying section, to a location that is above the upper part of the stripping column (in other words, above feed stage 2*f*), as shown in FIG. 4, for example. The disposition like this does not change the flow itself of the fluids at all, and if the stage of lower part 1*d* of the rectifying section is moved and disposed above feed stage 2*f*, region 2*g*, that corresponds to the lower part of the rectifying section, can be operated under the pressure of stripping column 2 which is lower than the pressure of rectifying column 1. As a result, the relative volatility in region 2*g* becomes large, and the energy (heat amount) itself which is originally necessary for a separating process can be reduced.

Further, in the case of the configuration in which outlet pipe 4*a* of compressor 4 is connected to the position directly above lower part 1*d* of the rectifying section, as shown by the dotted lines in FIGS. 4 to 6, the vapor from outlet pipe 4*a* of compressor 4 is supplied into rectifying column 1, and from rectifying column 1, heat is transferred to heat exchanging section 2*h* in the lower part of stripping column 2, and returns to the position of rectifying column 1 to which outlet pipe 4*a* is connected, again. The present inventors have considered that, if that is the case, adoption of such an apparatus configuration is more preferable, that outlet pipe 4*a* of compressor 4 be directly connected to heat exchanging section 2*h* at the low part of stripping column 2 without being connected all the way to rectifying column 1, and that the fluids which are subjected to heat exchange at heat exchanging section 2*h* be introduced into rectifying column 1.

In the case of the apparatus configuration based on the above concept, the apparatus configuration of FIG. 5 becomes an apparatus configuration of FIG. 7, and the apparatus configuration of FIG. 6 becomes an apparatus configuration of FIG. 8, though the details thereof will be described later. According to the apparatus configurations of FIGS. 7 and 8, among a plurality of heat transfer systems which perform heat exchange between several stages of respective low-pressure column and a high-pressure column, in one heat transfer system provided between the lower part of a low-pressure column and the lower part of a high-pressure column, high-pressure vapor from compressor 4 is directly fed to heat exchanger 8 at the lower part of the low-pressure column, and the high-pressure vapor which gives heat to the lower part of the low-pressure column through heat exchanger 8 is introduced into rectifying column 1, as shown in FIGS. 7 and 8. In this heat transfer system, both the apparatus configuration of FIG. 2 and the apparatus configuration of FIG. 3 are improved. The reason for this is as follows.

That is to say, in the apparatus examples of FIGS. 2 and 5, circulation of the fluids by the thermo-siphon effect is used in order to perform heat exchange between the rectifying section and the stripping section, and in order to cause the fluid to circulate, a liquid head is necessary at the supply side (pipe 24 outside the column) of tube-bundle-type heat exchanger 8. However, the apparatus configuration of FIG. 7 does not need a liquid head in some heat transfer systems, and therefore, improvement in energy saving performance is expected.

Meanwhile, in the apparatus example of FIG. 3, the high-pressure vapor which is supplied to rectifying column 1 moves into stripping column 2 through pipe 29 outside the column, and the fluids that partially or totally condense in heat exchanger 8 of liquid sump unit 2*e* in stripping column 2 return to rectifying column 1 through another pipe 30. For this purpose, it is necessary to partition the inside of rectifying column 1 completely with partition plate 16, connect pipe 29 to a lower space of partition plate 16, and connect pipe 30 to an upper space of partition plate 16 to set the pressure of the lower space of partition plate 16 to be higher. But, the apparatus configuration of FIG. 8 does not require a pressure difference in some heat transfer systems, and therefore, improvement in energy saving performance is expected.

SUMMARY OF THE INVENTION

An object of the present invention is to improve the aforementioned points in both of the apparatus configuration examples of FIGS. 2 and 3 as described above, and achieve further energy saving.

A heat integrated distillation apparatus according to an aspect of the present invention includes:

a high-pressure column that corresponds to a region above a heat exchanging section located at a lowermost part within a region including a trayed section or a packed bed section which is used as a rectifying section; and a low-pressure column that is located above, as seen from the high-pressure column, and that integrates a region including a trayed section or a packed bed section which is used as a stripping section, with a rectifying section corresponding portion that corresponds to a region locating below the heat exchanging section located at the lowermost part in the rectifying section.

The rectifying section corresponding portion is located on a top portion of the stripping section in the low-pressure column so that the rectifying section corresponding portion continues to the stripping section.

Furthermore, the above described aspect includes:

a first pipe that connects a column bottom of the high-pressure column with the rectifying section corresponding portion via means that pressure-feeds a liquid that remains in the column bottom of the high-pressure column to the rectifying section corresponding portion;

a heat exchanger located at a stage in a lower part (may be a lowermost stage or not) of the low-pressure column;

a second pipe that connects the rectifying section corresponding portion with the heat exchanger in a lower part of the low-pressure column;

a compressor installed in the second pipe and configured to compress vapor from the rectifying section corresponding portion and then feed the compressed vapor to the heat exchanger in the lower part of the low-pressure column; and a third pipe that introduces fluids flowing out from the heat exchanger in the lower part of the low-pressure column to the column bottom of the high-pressure column.

In the above aspect, the high-temperature vapor by the compressor is introduced into the heat exchanger which is located in the lower part (not limited to the lowermost stage) of the low-pressure column, and the fluids which flow out from the heat exchanger are introduced to the lower part of the high-pressure column, whereby heat is provided to the lower part (not limited to the lowermost stage) of the low-pressure column, and the fluids to be introduced to the lowermost part of the high-pressure column can be cooled. The heat transfer system (side heat exchanging section) using the second and the third pipes and the heat exchanger in the low-pressure column is configured as if a side condenser is installed at the stage of the lowermost part of the high-pressure column, and a side reboiler is installed at the stage of the lower part (not limited to the lowermost part) of the low-pressure column. Thus, as compared with a distillation apparatus that does not include the above described heat transfer system, the amount of heat that is removed can be reduced more at the condenser, and the amount of heat that is supplied can be reduced more at the reboiler.

In particular, the above described heat transfer system which enables heat exchange between the low-pressure column lower part and the high-pressure column lower part is configured to introduce the high-pressure vapor from the compressor directly into the heat exchanger which is provided at the low-pressure column and to thereby feed the fluids condensed in the heat exchanger into the high-pressure column. That is to say, the configuration does not need a liquid head as in the apparatus example of FIG. 2, or the pressure loss is not required as in the apparatus example of FIG. 3. Therefore, energy saving performance can be improved because the liquid head and the pressure loss are not needed. Further, the region corresponding to the lower part of the rectifying section (rectifying section corresponding portion) can be operated due to the pressure of the low-pressure column which is lower than the pressure of the high-pressure column, and therefore, as compared with the configurations of FIGS. 4 to 6, the relative volatility in the rectifying section corresponding portion becomes larger. Thus, the energy (heat amount) itself which originally becomes necessary for a separating process can be reduced.

From the above, the distillation apparatus with extremely high energy efficiency can be provided.

The rectifying section and the stripping section, or the high-pressure column and the low-pressure column are configured by using the trayed sections or packed bed sections similar to those of a general distillation apparatus. Hence, the apparatus can deal with side cutting or multi-feed stream without the need for any improvement, and it is possible to easily perform maintenance of the apparatus. For the same reason, the number of stages of the rectifying section or the stripping section can be freely set, and the feed stage can be optimized.

Furthermore, a heat transfer area can be freely set, and hence the heat exchanged rate can be determined without any dependence on the temperature difference between the columns.

According to the present invention, energy efficiency is high, side-cutting and setting of a feed stage position can be easily dealt with, and maintenance of the apparatus is easy. Further, the apparatus of the present invention has a structure in which a degree of freedom in design is high, and hence can be easily accepted by the user side.

In addition, according to the present invention, the aforementioned points in both of the apparatus configuration examples of FIGS. 2 and 3 are improved, and further energy saving can be achieved.

Figure 7:
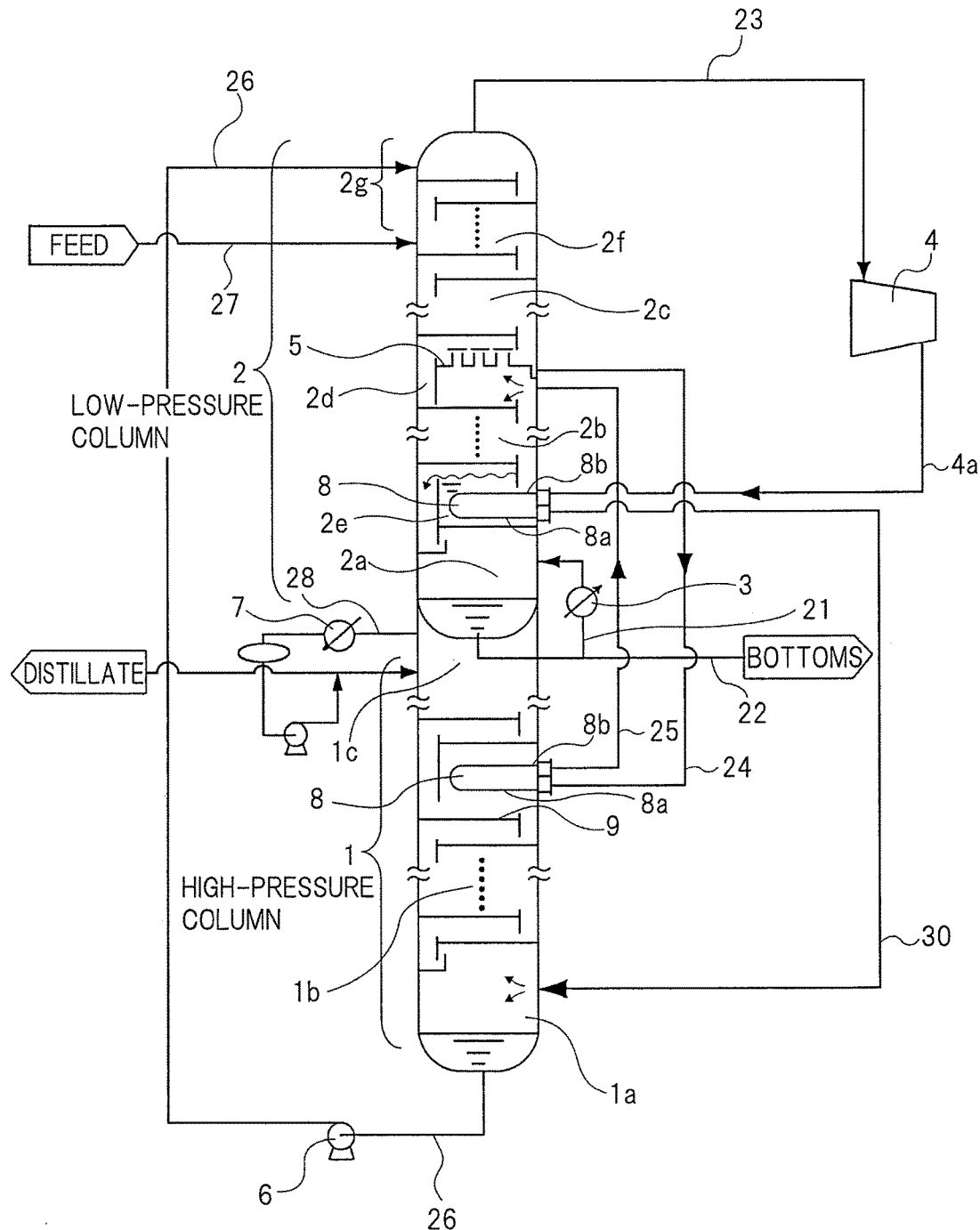
FIG. 7 shows an overall configuration of a heat integrated distillation apparatus according to one embodiment of the present invention.
Figure 8:
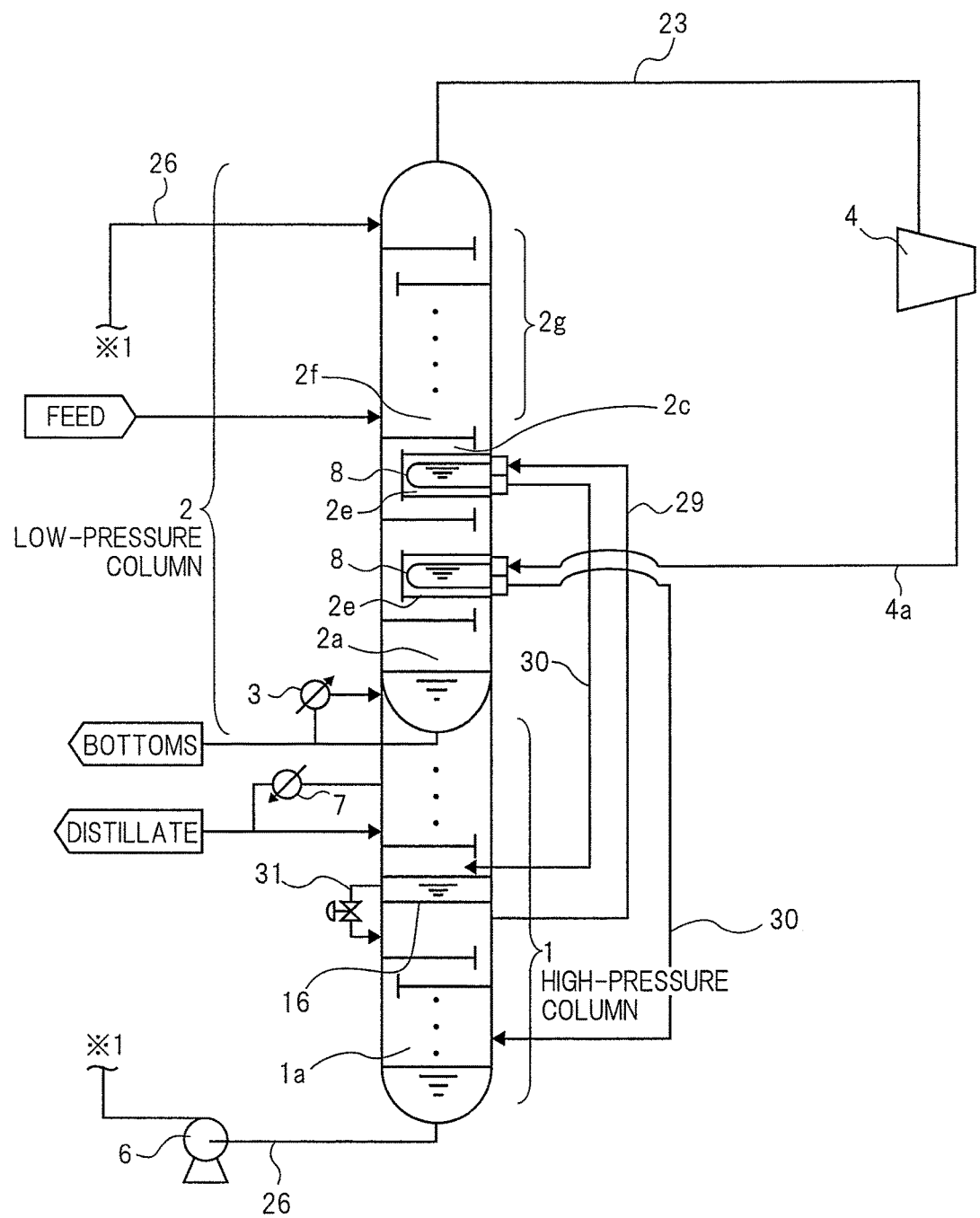
FIG. 8 shows an overall configuration of a heat integrated distillation apparatus according to another embodiment of the present invention.

EXPLANATION OF LETTERS 1 rectifying column (This is referred to as a high-pressure column in the embodiments of FIGS. 7 and 8.)
1a column bottom
1b trayed section (or packed bed section)
1c column top
1d the lower part of a rectifying section
2 stripping column (This is referred to as a low-pressure column in
the embodiments of FIGS. 7 and 8.)
2a column bottom
2b trayed section (or packed bed section)
2c column top
2d liquid withdrawal unit
2e liquid sump unit
2f feed stage
2g region that corresponds to the lower part of a rectifying section
3 heater (reboiler)
4 compressor
4a Pipe
5 chimney tray for sump
6 pump
7 condenser
8 tube-bundle-type heat exchanger
9 chimney tray for sump
10, 12, 14 liquid
11, 13, 18 vapor
15 chimney tray for sump
16 partition plate
21, 22, 23, 24, 25, 26, 27, 28, 29, 30, 31 pipe
X a liquid withdrawal position from a stripping column
Y a heat exchanger installation position of a rectifying column

DETAILED DESCRIPTION OF THE EXEMPLARY EMBODIMENT

Figure 1:
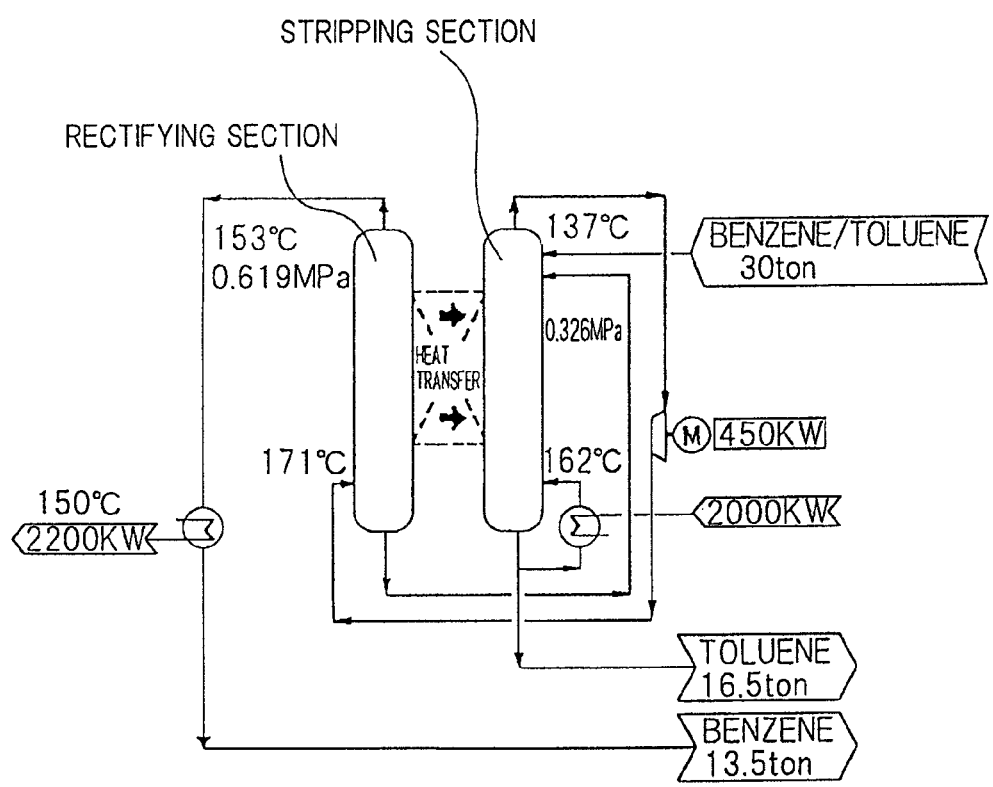
FIG. 1 shows a basic structure of HIDiC.
Figure 2:
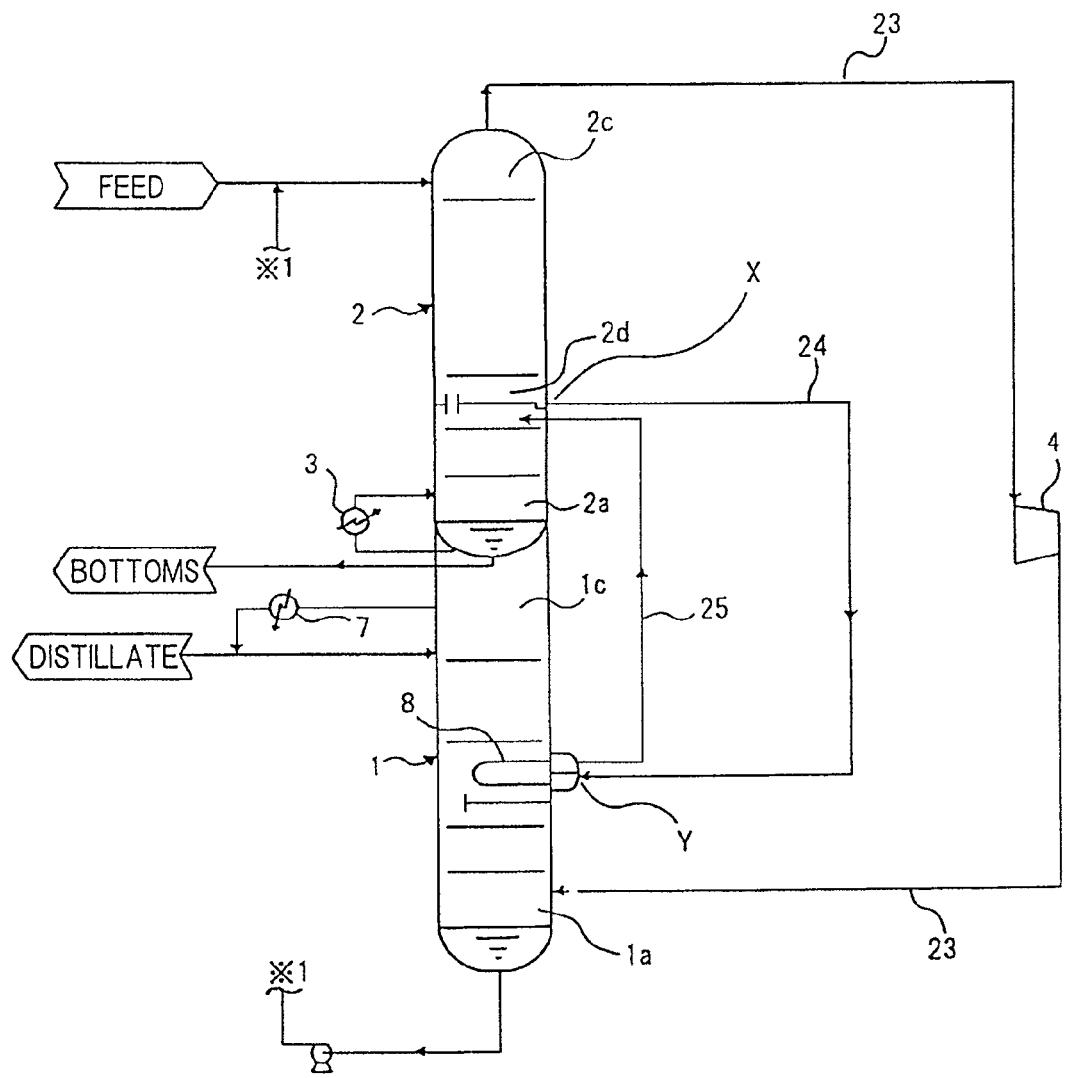
FIG. 2 is a schematic configuration diagram showing an example of a distillation apparatus which is relevant related art and which is disclosed in JP4803470B.
Figure 3:
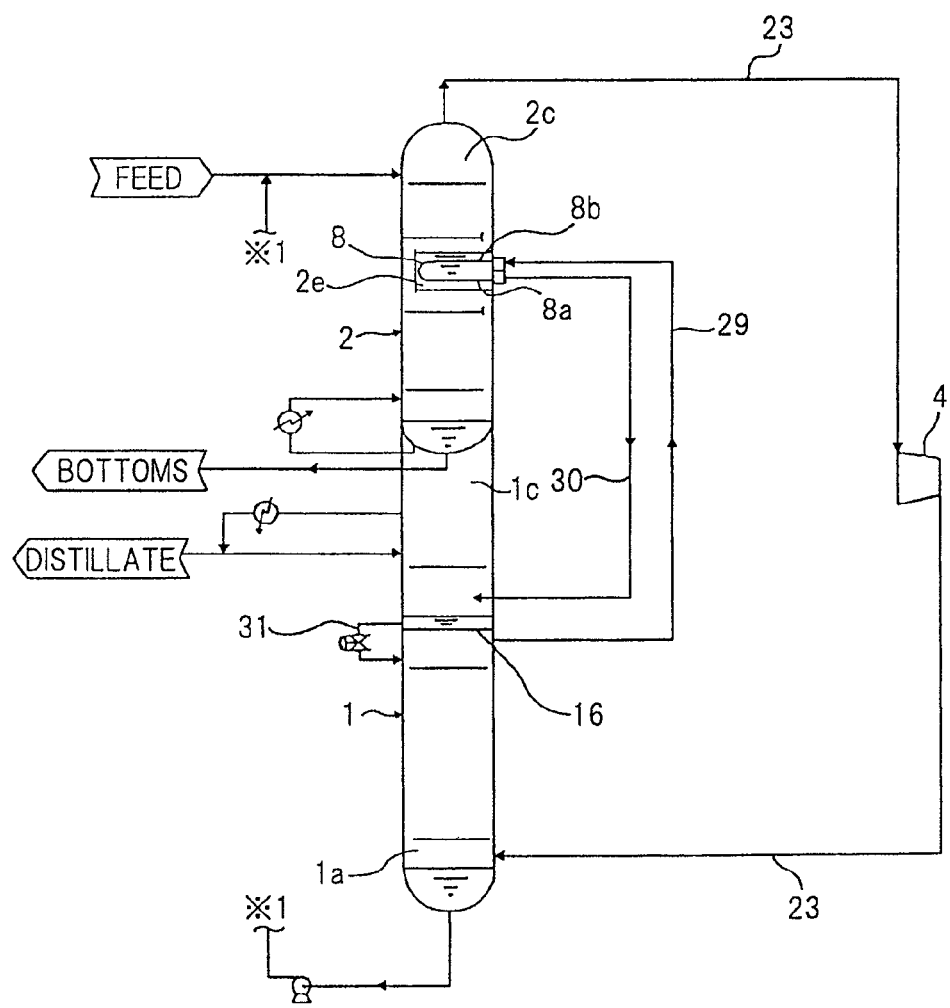
FIG. 3 is a schematic configuration diagram showing another example of the distillation apparatus which is relevant related art and which is disclosed in JP4803470B.

A heat integrated distillation apparatus according to the present invention has a basic feature in which a column shell (low-pressure column) that is the result of adding a region used as a stripping section extending in a vertical direction, and a region (or a rectifying section corresponding portion) that corresponds to a region locating below a side heat exchanging section at the lowermost stage among side heat exchanging sections installed in the rectifying section, and a column shell (high-pressure column) which includes a region, except for the aforementioned region that corresponds to the rectifying section of the rectifying section extending in the vertical direction, are separately provided, and the low-pressure column is located above as seen from the high-pressure column. A general distillation apparatus, which is not an internally heat integrated distillation apparatus, includes a column that is built in the vertical direction and that has a column bottom, a trayed section (or packed bed section), and a column top, wherein at the boundary of a feed location, an upper side of the trayed section (or packed bed section) is a rectifying section and a lower side is a stripping section, and the general distillation apparatus is totally different from the heat integrated distillation apparatus according to the present invention. In particular, an arrangement described as follows uses both the configurations of the distillation apparatuses of FIGS. 2 and 3 which the present applicant has already proposed. Thus, an embodiment example of the present invention will be described by using the same reference signs for the same components as those shown in FIGS. 2 and 3.

FIG. 7 shows an overall configuration of a heat integrated distillation apparatus according to one embodiment of the present invention. The heat integrated distillation apparatus according to the embodiment comprises high-pressure column 1 which corresponds to a remaining region of a rectifying section excluding a region which corresponds to stages locating below a region of side heat exchange that is performed at a lowest part within the rectifying section; and low-pressure column 2 which is a result of adding an overall stripping section located above as seen from high-pressure column 1, and the aforementioned rectifying section lower part. High-pressure column 1 includes column bottom 1a, trayed section (or packed bed section) 1b, and column top 1c. Low-pressure column 2 also includes column bottom 2a, trayed section (or packed bed section) 2b, column top 2c and rectifying section lower part 2g which will be described later.

Figure 4:
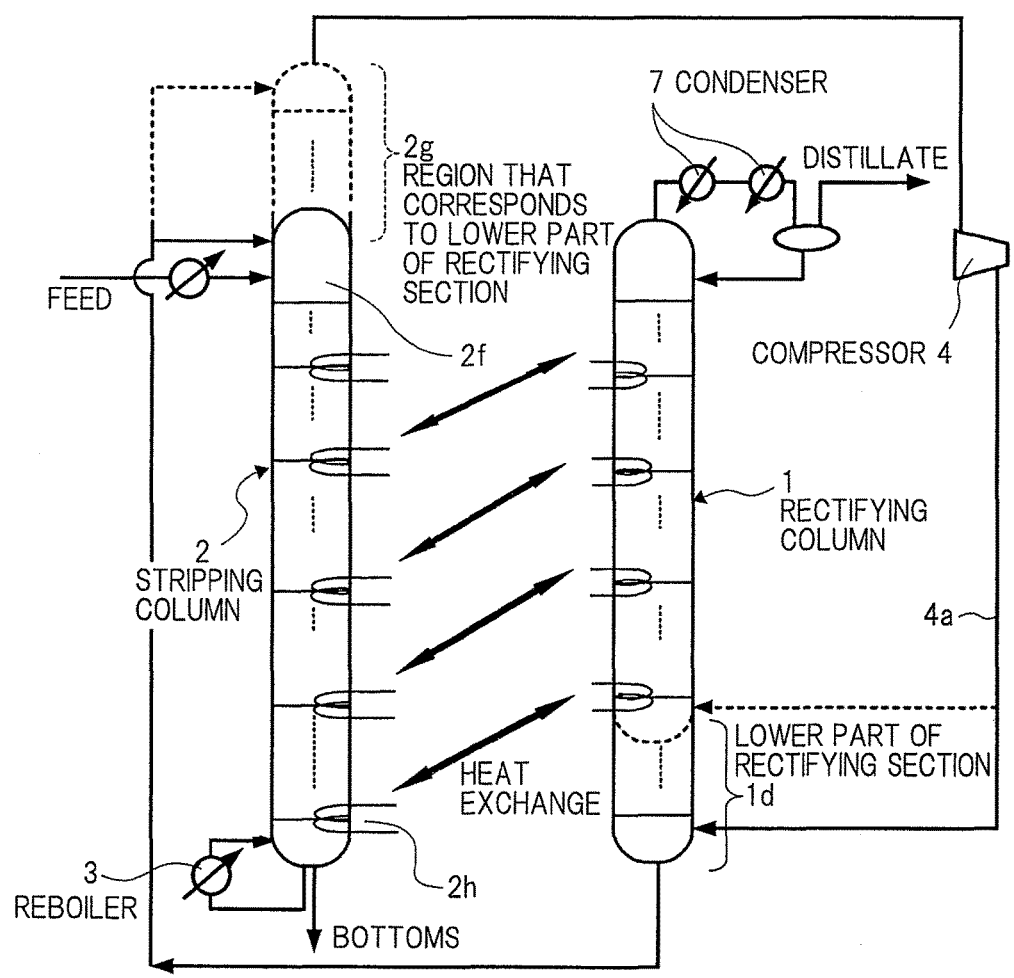
FIG. 4 is an apparatus conceptual diagram shown to explain circumstances of aiming at the invention of the present application.

Further, as described by using FIGS. 4 and 5 in the section of SUMMARY OF THE INVENTION, high-pressure column 1 of the embodiment corresponds to the region (rectifying section upper part) which remains after rectifying section lower part 1d is cut off from rectifying column 1 of FIG. 5, and the region (hereinafter, called rectifying section corresponding portion 2g), which corresponds to rectifying section lower part 1d which is cut off from the rectifying column, is located above stripping section top 2c of low-pressure column 2. In the configuration in which the upper part of the low-pressure column upper part can be used as rectifying section corresponding portion 2g like this, rectifying section corresponding portion 2g can be operated under the pressure of low-pressure column 2 whose pressure is lower than the pressure of rectifying column 1 of FIG. 5. Thus, the relative volatility in rectifying section corresponding portion 2g becomes large, and energy (heat amount) itself which is originally needed for a separating process can be reduced.

Trayed sections 1b and 2b are sections where several horizontal trays are located therein. Space between adjacent trays is referred to as a stage. At each stage, when contact is made with gas-liquid, a mass transfer is caused to occur. As a result, gas phases rich in components that have higher volatility ascend to an upper stage, while a liquid phase rich in components having lower volatility descend to a lower stage. Then, contact with gas-liquid is executed again with a new liquid phase or gas phase so that a mass transfer is caused to occur. Thus, there are abundant components having higher volatility at a higher stage of the column, there are abundant components having lower volatility at a lower stage, and a distillation operation is accomplished.

The packed section that can replace the trayed section is a section where a certain packing is installed in the empty column, and contact with gas-liquid is executed on its surface. By the same mechanism as that of the trayed section, there are abundant components that have higher volatility at a higher part, there are abundant components that have lower volatility at a lower part and a distillation operation is accomplished. In FIG. 7, trayed sections 1b and 2b (or packed bed sections) are shown as blank. In reality, however, the abovementioned structures are employed.

Each of high-pressure column 1 and low-pressure column 2 is described in detail. First, low-pressure column 2 is described. Heater 3 referred to as a reboiler is disposed outside column bottom 2a of low-pressure column 2, and pipe 21 is provided from a lower part of space in column bottom 2a through heater 3 to an upper part of space in column bottom 2a. Liquid descending through trayed section 2b (or packed bed section) of low-pressure column 2 accordingly stays at column bottom 2a. A part of the liquid is heated by heater 3 to become vapor, and ascends to the column top. From the very bottom of column bottom 2a, bottoms that are rich in components with lower volatility are acquired through pipe 22.

Stripping section top 2c in low-pressure column 2 is a position for supplying feed stream, and in this region, feed stage 2f is provided. As described above, rectifying section corresponding portion 2g is located above the stripping section in low-pressure column 2 (namely, above feed stage 2f). Rectifying section corresponding portion 2g and stripping section top 2c in low-pressure column 2 are connected so that the interior of rectifying section corresponding portion 2g and the interior of stripping section top 2c come into contact with each other. According to the embodiment, the feed stream is supplied at stripping section column top 2c in low-pressure column 2, but if the feed location needs to correspond to a change in feed stream composition, the feed location may be at an arbitrary stage of trayed section 2b (or packed bed section). Even when there is a plurality of feeds, the feed location can be stripping section top 2c in low-pressure column 2, and other arbitrary stages (including a stage of high-pressure column 1).

Figure 9:
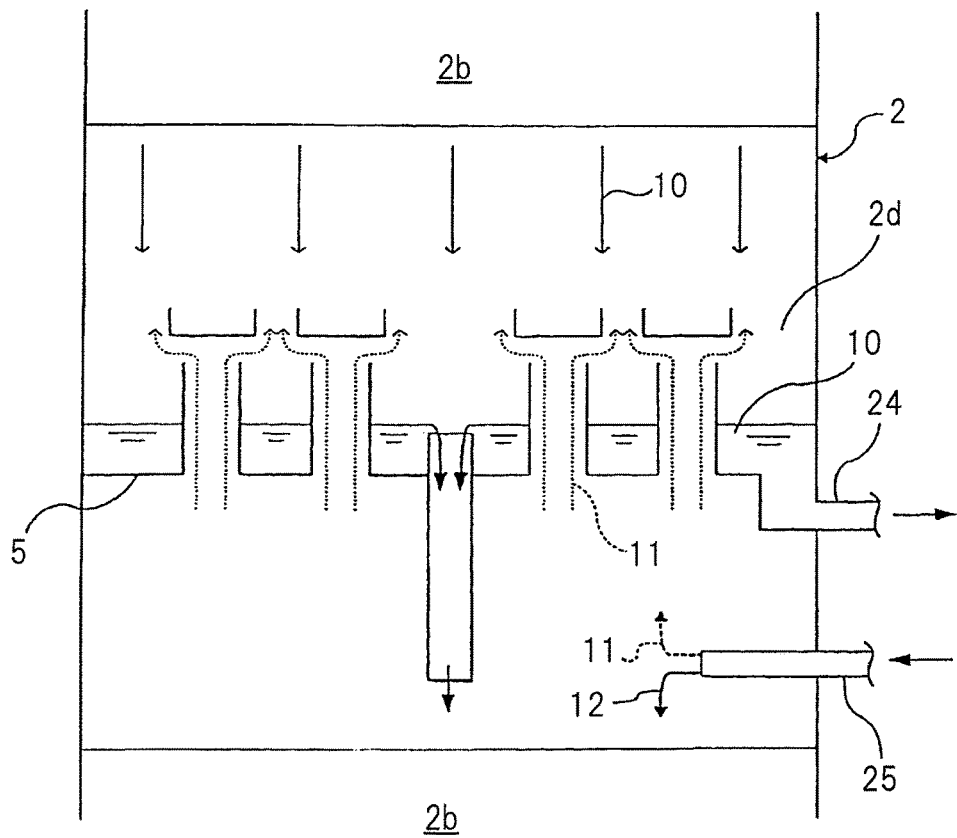
FIG. 9 shows a peripheral configuration of a tube-bundle-type heat exchanger located in a low-pressure column of each of FIGS. 7 and 8.

Trayed section 2b (or packed bed section) of low-pressure column 2 includes liquid withdrawal unit 2d at a predetermined stage. Liquid withdrawal unit 2d is at a stage located at an upper side from liquid sump unit 2e which will be described later. As shown in FIG. 9, liquid withdrawal unit 2d holds liquid 10 that descends from above at chimney tray for sump 5, and withdraws a part of liquid 10 to the outside of low-pressure column 2. Pipe 24 for directing a part of liquid 10 to high-pressure column 1 is connected to liquid withdrawal unit 2d. Pipe 25 from high-pressure column 1 is inserted through a shell wall of low-pressure column 2 into a stage directly below liquid withdrawal unit 2d. From pipe 25 inserted into the stage directly below liquid withdrawal unit 2d, fluids having a mixture of vapor 11 and liquid 12 are introduced as described below, and vapor 11 ascends while liquid 12 descends.

Figure 11:
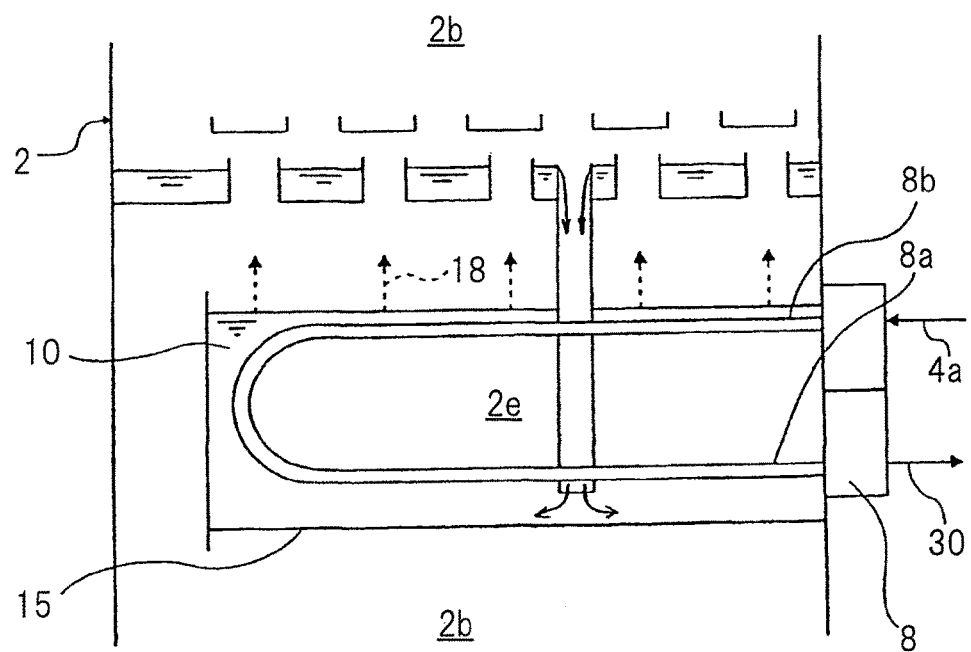
FIG. 11 shows a peripheral configuration of a tube-bundle-type heat exchanger located in the high-pressure column of each of FIGS. 7 and 8.

In addition, trayed section 2b (or packed bed section) which is closest to column bottom 2a of low-pressure column 2 includes liquid sump unit 2e. Liquid sump unit 2e stores a predetermined amount of liquid 10 that has flowed down onto chimney tray for sump 15, and the liquid spilled from chimney tray for sump 15 drops. So that the tube of tube-bundle-type heat exchanger 8 can be dipped in the liquid stored by liquid sump unit 2e, tube-bundle-type heat exchanger 8 is located in liquid sump unit 2e (refer to FIG. 11). Parallel tube portions 8a and 8b in the U-shaped tube of tube-bundle-type heat exchanger 8 are arranged along chimney tray for sump 15.

Pipe 4a (refer to FIG. 7) connected to an outlet of compressor 4 is connected to upper tube portion 8b of the parallel tube portions. Pipe 30 (refer to FIG. 7) for feeding fluids from low-pressure column 2 to column bottom 1a of high-pressure column 1 is connected to lower tube portion 8a. Rectifying section corresponding portion 2g located on low-pressure column 2 is connected to an inlet of compressor 4 through pipe 23.

An operation of heat exchanger 8 in liquid sump unit 2e is described.

In the distillation apparatus described above, a feed liquid descends from stripping section top 2c (feed stage 2f) in low-pressure column 2 through a tray or a packed layer. Liquid 10 (refer to FIG. 11) stays at liquid sump unit 2e on chimney tray for sump 15 that is located at an arbitrary stage. The U-shaped tube of tube-bundle-type heat exchanger 8 is located in liquid sump unit 2e, and hence the U-shaped tube is dipped in liquid 10. In this state, high-temperature vapor by compressor 4 is introduced through pipe 4a into upper tube portion 8b of heat exchanger 8 in liquid sump unit 2e. At this time, a part of liquid 10 in contact with the shell wall of tube portions 8b and 8a, where the high-temperature vapor moves, is heated to become vapor 18 and ascends (refer to FIG. 11). The liquid that remains without becoming vapor descends over an outlet gate. The high-temperature vapor introduced through pipe 4a into heat exchanger 8 in low-pressure column 2 is partially or totally condensed and is changed into a liquid phase from a gas phase while being moved from upper tube portion 8b to lower tube portion 8a. The liquid which is generated by the condensation and the vapor which is not condensed passes through pipe 30 that locates outside the column and then is fed to column bottom 1a of high-pressure column 1 (refer to FIG. 7).

High-pressure column 1 is further described.

One end of pipe 26 is connected to the very bottom of column bottom 1a of high-pressure column 1, while the other end of pipe 26 is connected to rectifying section corresponding portion 2g located above stripping section top 2c (feed stage 2f) in low-pressure column 2. To recycle the liquid, that remains at column bottom 1a of high-pressure column 1, to rectifying section corresponding portion 2g, pump 6 is necessary at the midway section of pipe 26.

Condenser 7 is equipped outside of column top 1c of high-pressure column 1, and pipe 28 is connected from an upper space part of column top 1c to condenser 7. Thus, vapor that has moved to column top 1c of high-pressure column 1 is cooled by condenser 7 to become liquid, and distillate liquid that is rich in components having high volatility is acquired. A part of the liquid is refluxed to column top 1c whenever this is necessary.

In addition, tube-bundle-type heat exchanger 8 is inserted into a stage locating above the position where pipe 30 is connected, of trayed section 1b of high-pressure column 1. The parallel tube portions in the U-shaped tube of tube-bundle-type heat exchanger 8 are placed along chimney tray for sump 9 to temporarily hold condensed liquid and to re-distribute vapor that ascends from below. Lower tube portion 8a of the parallel tube portions is connected to pipe 24 connected to liquid withdrawal unit 2d of low-pressure column 2. Upper tube portion 8b is connected to pipe 25 that is inserted into the stage directly below liquid withdrawal unit 2d.

An operation of tube-bundle-type heat exchanger 8 is described.

Figure 10:
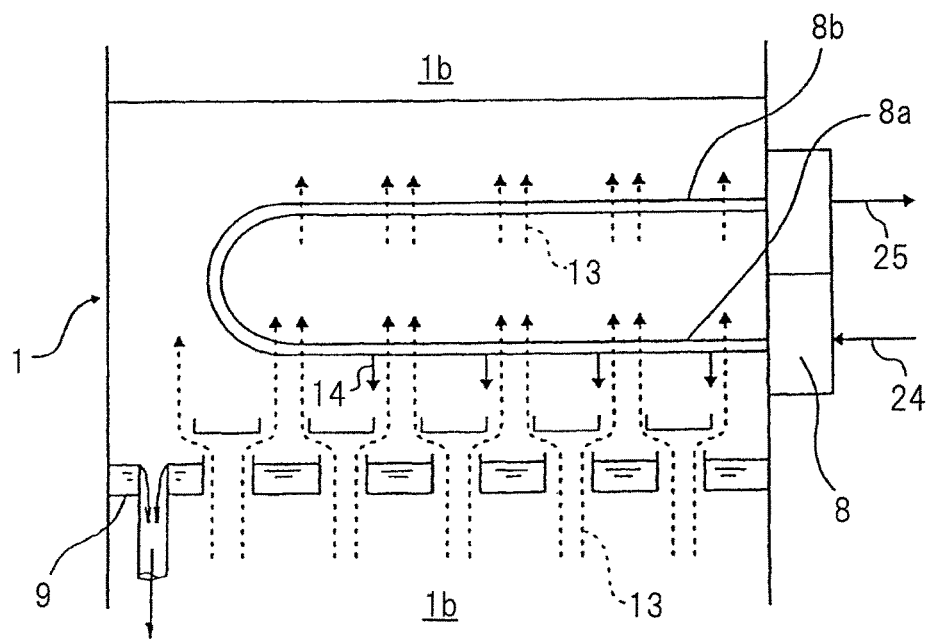
FIG. 10 shows a configuration of a liquid withdrawal unit located in a high-pressure column of each of FIGS. 7 and 8.

In the apparatus, the pressure and temperature of vapor flowing out of rectifying section corresponding portion 2g are increased by compressor 4. Thereafter, a part or all of the vapor is condensed by heat exchanger 8 in low-pressure column 2, and is supplied to column bottom 1a of high-pressure column 1. Vapor 13 (refer to FIG. 10) of the fluids supplied to column bottom 1a ascends in trayed section 1b and comes into contact with the tube of tube-bundle-type heat exchanger 8 in high-pressure column 1. In this case, liquid at an arbitrary stage of low-pressure column 2 is introduced through pipe 24 to lower tube portion 8a of heat exchanger 8. Thus, the liquid in tube portion 8a is heated by the heat of vapor 13, and a part of vapor 13 in contact with tube portion 8a is condensed and becomes liquid 14, which descends. Upper tube portion 8b of heat exchanger 8 is also heated by the heat of vapor 13. Thus, the liquid introduced through pipe 24 into heat exchanger 8 changes into fluids having a mixture of liquid phase 12 and gas phase 11 while moving from lower tube portion 8a to upper tube portion 8b. The fluids then pass through pipe 25 that locates outside the column to be introduced to the stage directly below liquid withdrawal unit 2d of low-pressure column 2 (refer to FIGS. 7 and 9). A pressure-feeding means such as a pump is not needed to circulate such fluids because the configuration employs the thermo-siphon system.

In other words, because liquid withdrawal unit 2d of low-pressure column 2 is connected to lower tube portion 8a of heat exchanger 8 of high-pressure column 1 via pipe 24 and because upper tube portion 8b of heat exchanger 8 of high-pressure column 1 is connected to the stage directly below liquid withdrawal unit 2d of stripping column 2 via pipe 25, the liquid descends from low-pressure column 2 to high-pressure column 1 by gravity, and the fluids which have gone through heat exchanger 8 of high-pressure column 1 are circulated and moved from high-pressure column 1 to low-pressure column 2 by the thermo-siphon effect.

The distillation apparatus of the aforementioned embodiment provides the following effect. The high-temperature vapor by compressor 4 is directly introduced into heat exchanger 8 in low-pressure column 2, and the fluids that flow from heat exchanger 8 are introduced to the lower part of high-pressure column 1 as described above, whereby heat is given to the lower part of low-pressure column 2, and the fluids to be introduced to the lower part of high-pressure column 2 can also be cooled. A first heat transfer system (side heat exchanging section) using pipes 4a and 30 and heat exchanger 8 in low-pressure column 2 is configured as if a side reboiler is installed at the stage (may be the lowermost stage or not) of the lower part of low-pressure column 2, and a side condenser is installed at the stage (lowermost stage) of the lower part of high-pressure column 1. Thus, as compared with a distillation apparatus that does not include the first heat transfer system, the amount of heat that is removed can be reduced at condenser 7 of high-pressure column 1, and the amount of heat that is supplied can be reduced at reboiler 3 of low-pressure column 2.

As described above, heat can be removed from the vapor in high-pressure column 1 by heat exchanger 8 in high-pressure column 1, and the heat can be transferred from high-pressure column 1 to low-pressure column 2 through pipe 25. A second heat transfer system (side heat exchanging section) using pipes 24 and 25 and heat exchanger 8 in high-pressure column 1 is configured as if a side condenser is installed at the stage above the lower part of high-pressure column 1, and, simultaneously, as if a side reboiler is installed at a stage above the lower part of low-pressure column 2. Thus, as compared with a distillation apparatus that does not include the second heat transfer system, the amount of heat that is removed can be further reduced at condenser 7 of high-pressure column 1, and the amount of heat that is supplied can be further reduced at reboiler 3 of low-pressure column 2.

Above all, the above described first heat transfer system which enables heat exchange between the lower part of the low-pressure column and the lower part of the high-pressure column is configured to introduce the high-pressure vapor from compressor 4 directly into heat exchanger 8 of liquid sump unit 2e provided in low-pressure column 2, and is configured to feed the fluid condensed in heat exchanger 8 into high-pressure column 1 (FIG. 7). The configuration does not need a liquid head as in the apparatus example of FIG. 2 as described in the section of SUMMARY OF THE INVENTION, and hence a corresponding improvement in energy saving performance can be expected. As compared with the apparatus configuration of FIG. 5 which adopts the above described second heat transfer systems for all the side heat exchanging sections provided in the distillation apparatus, energy saving performance is further enhanced.

According to the embodiment, rectifying section corresponding portion 2g can be operated under the pressure of low-pressure column 2 which is lower than the pressure of high-pressure column 1 as described above. Thus, as compared with the apparatus configuration of FIG. 5, the relative volatility in rectifying section corresponding portion 2g becomes large, and energy (heat amount) itself which is originally necessary for a separating process can be reduced.

FIG. 7 shows only two of the heat transfer systems described above. However, the number of heat transfer systems equivalent to, for example, 10 to 30% of the total number of theoretical stages, can be installed. Needless to say, the number of heat transfer systems to be installed and the locations of the heat exchanger and the pipes can be arbitrarily determined according to the design specification.

Figure 5:
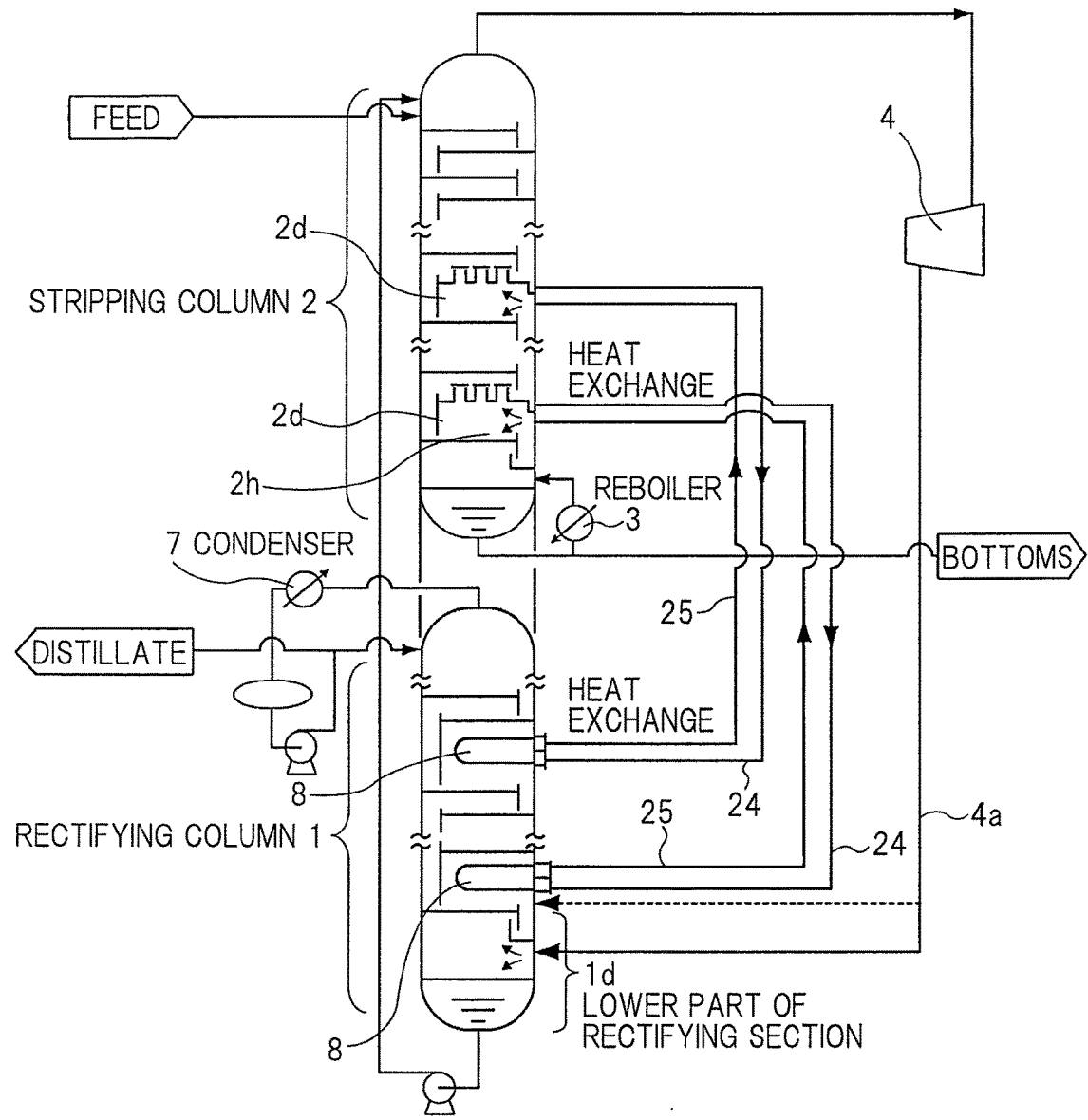
FIG. 5 shows a mode of carrying out an apparatus configuration of FIG. 2 based on the conceptual configuration of FIG. 4.
Figure 6:
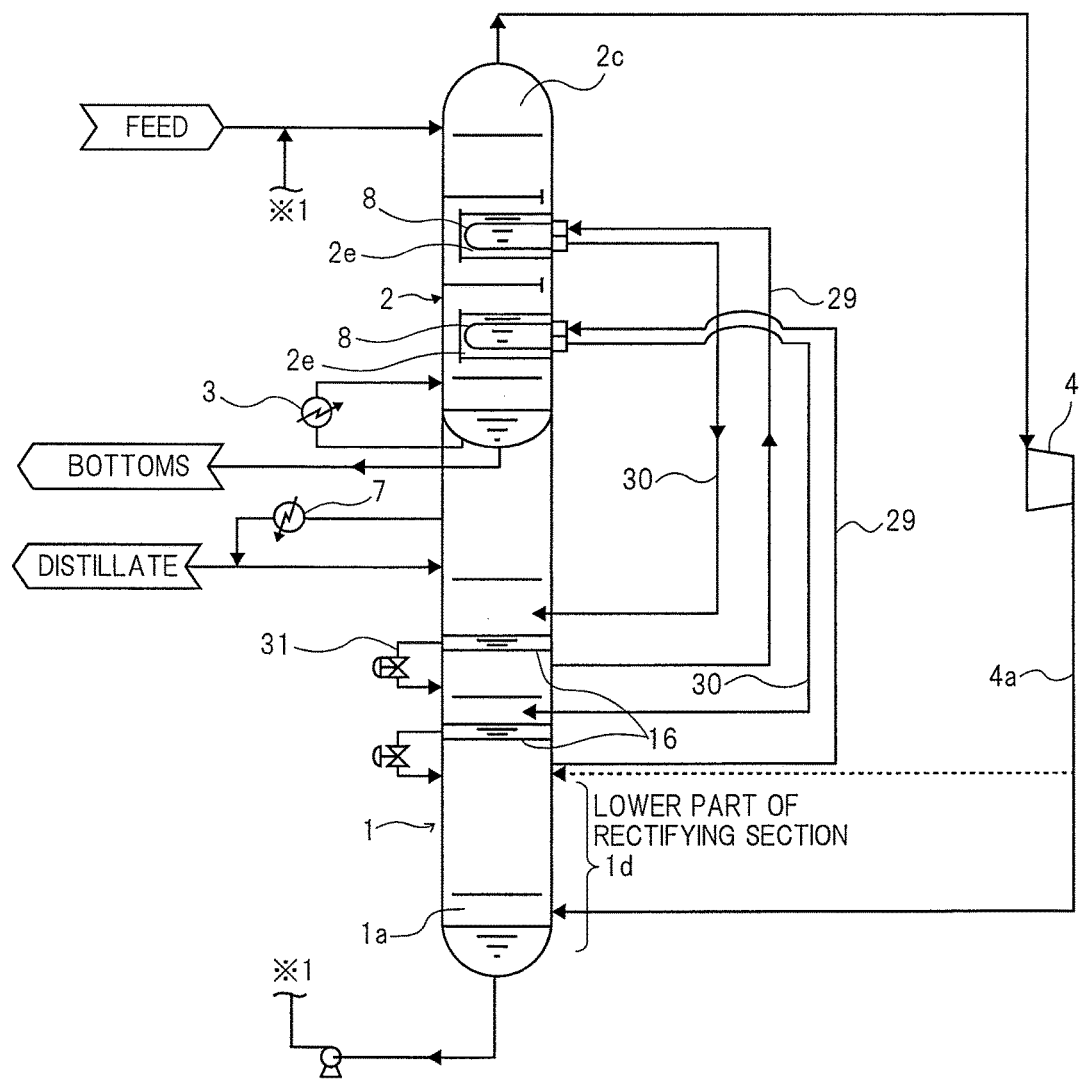
FIG. 6 shows a mode of carrying out an apparatus configuration of FIG. 3 based on the conceptual configuration of FIG. 4.

The aforementioned apparatus of FIG. 7 adopts the method which directly introduces the high-temperature vapor via compressor 4 to heat exchanger 8 at the lower part of the stripping section of low-pressure column 2, and introduces the fluids that flow out of heat exchanger 8 to the lower part of high-pressure column 1, for the heat transfer system which performs heat exchange between the side heat exchanging section which is located at the lowest position in the stripping section in the apparatus of FIG. 5 and the side heat exchanging section which is located at the lowest position in the rectifying section. However, the method can be adopted for a heat transfer system which performs heat exchange between the side heat exchanging section which is located at the lowest position in the stripping section in the apparatus of FIG. 6, and the side heat exchanging section which is located at the lowest position in the rectifying section, and the result is the apparatus configuration of FIG. 8. The configuration does not need pressure loss as in the apparatus example of FIG. 3, and hence energy saving performance can be improved as in the case of the apparatus of FIG. 7. Rectifying section corresponding portion 2g can be operated under the pressure of low-pressure column 2 which is lower than the pressure of high-pressure column 1, and hence the energy (heat amount) itself which becomes necessary for a separating process can be reduced as in the case of the apparatus of FIG. 7.

The heat integrated distillation apparatus described above is configured by using the trayed column or the packed column similar to that of the general distillation apparatus. This enables side-cutting or multi-feeding without any need to improve the apparatus, and enables easy maintenance of the apparatus. For the same reason, freedom to set the numbers of stages for the high-pressure column and the low-pressure column enables optimization of feed stages. In other words, the present invention can solve problems 1) to 5) of the heat integrated distillation apparatus using the double-pipe structure represented by JP2004-16928A.

According to the above described embodiments (FIGS. 7 and 8), tube-bundle-type heat exchanger 8 is used as the component of the heat transfer system that transfers heat from high-pressure column 1 to low-pressure column 2. This enables free changing of heat transfer area A based on the tube design of heat exchanger 8. Thus, in order to determine the amount of heat that is to be exchanged between high-pressure column 1 and low-pressure column 2, not only temperature difference ΔT between high-pressure column 1 and low-pressure column 2 but also heat transfer area A can be freely set. The present invention can therefore solve problem 6) of the heat integrated distillation apparatus using the double-pipe structure.

The preferred embodiments of the present invention have been described. However, the embodiments in no way limit of the present invention. Needless to say, various changes can be made to the present invention within its technical teachings.

According to the above described embodiments (FIGS. 7 and 8), high-pressure column 1 and low-pressure column 2 including rectifying column corresponding portion 2g are connected to each other in the vertical direction. However, the present invention is not limited to this arrangement. In other words, the present invention includes an arrangement where high-pressure column 1 and low-pressure column 2 including rectifying column corresponding portion 2g are configured separately and independently.

What is claimed is:

1. A heat integrated distillation apparatus comprising:
   a high-pressure column including a trayed section or a packed bed section which constitutes a part of a rectifying section;
   a low-pressure column located higher than said high-pressure column and having a first region that includes a trayed section or a packed bed section which constitutes a part of a stripping section and a second region that includes a trayed section or a packed bed section which constitutes another part of the rectifying section, wherein the second region is located on a top portion of the first region in said low-pressure column so that the second region continues to the first region;
   a first pipe that connects a column bottom of said high-pressure column with the second region via means that pressure-feeds a liquid held in a column bottom of said high-pressure column to the second region;
   a heat exchanger located at a stage in a lower part of said low-pressure column;
   two second pipes;
   a compressor that is connected with the second region through one of the two second pipes and with said heat exchanger in the lower part of the low-pressure column through the other of the two second pipes so as to compress vapor from the second region and then feed the compressed vapor to said heat exchanger in the lower part of the low-pressure column; and
   a third pipe that introduces fluid flowing out from said heat exchanger in the lower part of said low-pressure column to the column bottom of the high-pressure column.

2. The heat integrated distillation apparatus according to claim 1, further comprising:
   a second heat exchanger that is located at a stage locating above a position where said third pipe is connected to the column bottom of said high-pressure column;
   a liquid withdrawal section that is located at a stage locating above the lower part of said low-pressure column to which said second pipes are connected, and that removes a part of liquid from the stage to outside the column;
   a fourth pipe that introduces the liquid from said liquid withdrawal section to said second heat exchanger; and
   a fifth pipe that introduces fluid that passes through said fourth pipe to be introduced into said second heat exchanger and then flows out from the second heat exchanger, to a stage directly below said liquid withdrawal section of said low-pressure column.

3. The heat integrated distillation apparatus according to claim 1, further comprising a raw material supply pipe that supplies a raw material to the top portion of the first region directly below the second region.

4. The heat integrated distillation apparatus according to claim 1, further comprising a reboiler that is installed outside the column bottom of said low-pressure column and heats liquid in the column bottom.

5. The heat integrated distillation apparatus according to claim 1, further comprising a condenser that is placed outside the column top of said high-pressure column and cools vapor in the column top.

* * * * *